United States Patent Office 2,838,099
Patented June 10, 1958

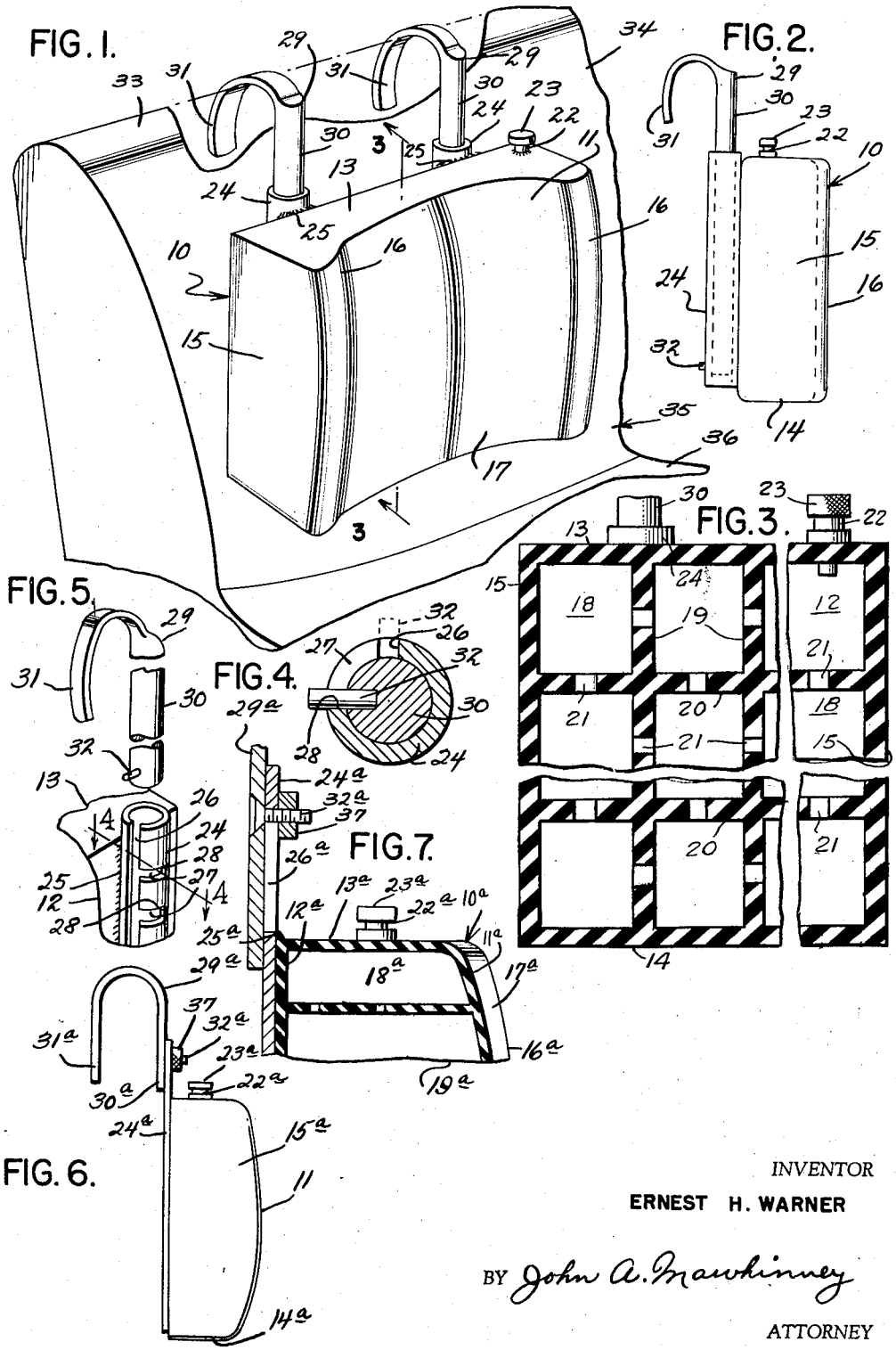

2,838,099
BACK CUSHION FOR AUTOMOBILES OR THE LIKE
Ernest H. Warner, Nova, Ohio
Application August 4, 1953, Serial No. 372,351
5 Claims. (Cl. 155—182)

The present invention relates to improvements in a back cushion for automobiles or the like and has for an object the provision of a device of this kind which is capable of being adjusted to suit the requirements or the individual needs of the occupant of the automobile seat.

*The problem.*—The back of an automobile seat may be of the finest possible design and construction, and yet continuously comfortable for only a relatively few persons, namely, those whose individual anatomy and habits of posture agree with the particular design. All the designer can do is try to strike a happy medium. The need is therefore for provision of adjustability in the passenger's or driver's back support, by some means meeting all the requirements in an accessory that would be easy for anyone to install instantly, with results comparable, for example, to what has long been provided in desk chairs for typists.

*The solution.*—This automobile back cushion is made to hang on the back of the conventional upholstered seat, without any alteration whatever in the latter, and can be instantly removed when not wanted. A flexible and inflatable member not only gives cushion-support to the back of a person leaning back upon it, but automatically adjusts its shape in response to pressures exerted upon it at any particular points. A pair of hooks adapted to engage the top of the conventional seat are attached to the inflatable member in such a way that their extension above the top of the cushion, and therefore the elevation of the latter, may be very easily adjusted over a considerable range, according to the preference of the person using the cushion at any given time.

Another object of the present invention is to provide a device of this character which may be inflated to the desired extent to suit the individual comfort of the particular person using the cushion.

A further object of the present invention is to provide a cushion of this type, the air chamber of which may be deflated and the other parts collapsed to form a compact unit capable of being stored in a relatively small space.

With the foregoing and other objects in view, the invention will be hereinafter more fully described and more particularly pointed out in the appended claims.

In the drawings, in which the same parts are denoted by the same reference numerals throughout the several views, Figure 1 is a front perspective view of a portion of an automobile seat with parts broken away and with the improved device mounted thereon, Figure 2 is a side elevational view of the improved device alone and in deflated condition, Figure 3 is a sectional view taken on the line 3—3 of Figure 1, Figure 4 is a sectional view taken on the line 4—4 of Figure 5, with the hook member in its lowered position, Figure 5 is a fragmentary rear perspective view of the improved device, Figure 6 is a side elevational view of a modified form of the invention, and Figure 7 is a fragmentary vertical sectional view of the form of the invention shown in Figure 6.

Referring more particularly to the drawings and especially to Figures 1 through 5, a hollow cushion for supporting the back of a person is generally indicated at 10. The cushion may be made of rubber, plastic or other suitable material which is capable of being inflated and is flexible and comprises a front wall 11, a rear wall 12, a top 13, a bottom 14 and side walls 15. When the cushion is inflated the front wall is convex in a vertical direction, as may be seen from Figure 1 of the drawings. The side portions of the cushion 10 are enlarged in a forward direction as at 16 and the part of the front wall between these side portions 16 is recessed as indicated at 17.

The interior of the cushion 10 is divided into a plurality of individual air chambers 18 by vertical partitions 19 and horizontal partitions 20. The vertical partitions 19 extend transversely of the cushion and have their opposite ends secured to the inner faces of the front 11 and rear wall 12 and their upper and lower edges secured to the inner faces of the top 13 and the bottom 14, respectively. The partitions 19 are spaced from one another and from the side walls of the cushion. The horizontal partitions 20 have their opposite ends secured to the inner faces of the side walls and their front and rear edges secured to the inner faces of the front and rear walls of the cushion. The partitions 20 are vertically spaced from one another and the uppermost partition 20 is spaced from the top 13 and the lowermost partition 20 is spaced from the bottom 14. The partitions 19 and 20 are joined at their points of intersection and are provided with openings 21 so that the chambers 18 are in communication with one another.

An air inlet valve 22 which may be of the conventional bicycle tube valve type is mounted in a suitable hole in the top 13 which opens into one of the chambers 18. A conventional cap 23 is removably carried by the valve 22.

A pair of tubular or fixed members 24 are secured by adhesive or any other suitable means, as indicated at 25, to the outer face of the rear wall 12 of the cushion 10 at horizontally spaced apart positions just inwardly of the enlarged portions 16. The member 24 extends beyond the top 13 of the cushion 10 and the lower end of each member 24 terminates short of the bottom 14 of the cushion, as shown in Figure 2 of the drawings.

Each member 24 has a longitudinally extending aperture or slit 26 which extends the entire length of the member and opens through the side wall and the upper and lower ends of the member 24. A series of longitudinally spaced apart recesses 27 extend in a circumferential direction partially around each member 24 and their outer ends open into the aperture 26 and their inner ends are bounded by a stop or abutment 28 which may be in the form of a wall. The recesses may extend substantially one-fourth around the members 24 or any other desirable distance. The slit 26 of each member 24 is disposed adjacent the rear wall 12 of the cushion and the recesses are directed away from the rear wall 12.

A supporting or hook member 29 is associated with each member 24 and each member 29 is adapted to be telescopically received by its member 24. Each member 29 comprises a shank portion 30 and a hook 31. The shank 30 may be solid as illustrated or hollow and is circular in cross section and of such a diameter as to be capable of having a sliding fit within its member 24. The shank 30 of each member 29 may be of any desired length and the hook 31 extends laterally from the upper end of the shank. A lug or pin 32 extends laterally from the lower end portion of each shank and underlies the hook 31.

In the use of the device, the cushion 10 will be inflated to the desired extent by introducing air under pressure to the air chambers 18 through the valve 22 after removal of the cap 23. Each member 29 will be rotated until its lug 32 is received by the slit 26 in its member 24 and then each member 29 will be moved into or out of its member 24 the desired distance and when the lug 32 is brought into registry with one of the recesses 27, the member 29 will be rotated until the lug engages the abutment 28.

At this time the members 29 will be retained against telescopic movement within their members 24 and the hooks 31 will be properly positioned to engage over the top 33 of the back 34 of a seat, generally indicated at 35, so that the cushion 10 will be supported against the back 34 at the desired distance above the seat portion 36 of the seat 35.

The inflatable cushion 10 which may be filled with air to any desired extent to suit the needs of the user will, due to convexity of its front wall, engage and support the small of the back of the user and will automatically adjust its shape in response to the local pressures applied throughout. These localized adjustments, due to the plurality of air chambers and the small openings 21 in the partitions, will be gradual so that when the occupant is suddenly and forcibly thrown back against the cushion there will not be a sudden collapse of the cushion, but a relatively slow accommodation of the localized area of the cushion affected. This action will serve effectively as a shock absorber and reduce to a negligible amount the shock which is imparted to the occupant of the seat.

The enlarged portions 16 which bound the recess 17 will prevent the occupant from sliding from side to side on the seat. The fact that the members 24 are attached to the cushion at points inwardly of the enlarged side portions 16 and the flexibility of the cushion will permit the rear wall 12 of the cushion to flex into contact with the back 34 of the seat to help hold the latter from shifting on the back 34, thereby to augment the gripping action of the hooks 31.

The height of the cushion above the seat portion may be changed by disengaging the hooks 31 from the back 34 and rotating the members 29 until the lugs 32 are received by the slit 26. The members 29 will then be moved telescopically until the lugs 32 are brought into registry with other recesses and rotation of the members 29 will lock them against telescopic movement and again bring the hooks into position for engaging the back 34.

When it is desired to store the improved device, the air will be allowed to escape from the cushion 10 and the lugs moved into the slits 26 and the members 29 moved into the members 24. At this time the hooks will extend substantially parallel to the rear wall 12 of the cushion and the device will be reduced to its smallest overall dimensions to form a compact unit.

In the form of the invention illustrated in Figures 6 and 7 of the drawings, 10a generally indicates a cushion which is similar to the cushion 10 and which comprises a front wall 11a, a rear wall 12a, a top 13a, a bottom 14a, side walls 15a, and side enlargements 16a. Between the enlargements 16a, the front wall is recessed as at 17a. The interior of the cushion is divided into air chambers 18a by partitions 19a and 20a which are provided with openings 21a. A valve 22a similar to valve 22 is mounted in a hole in the top 13a through which air under pressure may be introduced into one of the air chambers 18a. A cap 23a is removably carried by the valve 22a.

A pair of fixed members 24a which may be in the form of flat elongated strips are secured by adhesive or other suitable means as indicated at 25a to the outer face of the rear wall 12a of the cushion 10a at horizontally spaced apart positions just inwardly of the enlarged portions 16a. The upper end portion of each member 24a extends beyond the top 13a of the cushion and the lower end of each member 24a terminates short of the bottom 14a of the cushion. Each member 24a has a longitudinally extending aperture or slot 26a in its upper end portion.

A supporting or hook member 29a is associated with each member 24a and each set of members 29a and 24a is adapted to have relative longitudinal movement. Each member 29a comprises a shank portion 30a and a hook 31a. The shank portion is substantially flat and has a width substantially equal to that of the strip 24a. The shank of each member 29a carries a screw 32a or the like and the head of the screw is countersunk in the shank. The screw extends through and beyond the slot 26a in the member 24a and receives thereon a nut 37.

The operation of this form of the invention is the same as that illustrated in Figures 1 through 5, except that the members 24a and 29a are relatively adjusted by loosening the nuts 37 and sliding the members 24a up or down to change the height of the cushion with respect to the seat portion 36. When the proper adjustment has been made, the nuts 37 are tightened and the members are retained against relative movement.

It is obvious that various changes and modifications may be made in the details of construction and design of the above specifically described embodiment of this invention without departing from the spirit thereof, such changes and modifications being restricted only by the scope of the following claims.

What I claim is:

1. A back cushion for the seat of an automobile comprising an inflatable cushion for supporting the back of an occupant of the automobile and means for adjustably supporting said cushion above the seat portion of said seat comprising at least one tubular member fixed to said inflatable cushion and having a longitudinally extending slit therein and a series of longitudinally spaced apart transversely extending recesses opening into said slit and having a bottom wall angularly displaced from said slit substantially ninety degrees, and a hook member having a hook portion for engaging over the top of the back of said seat, a shank portion slidably received by said tubular member and a lug extending from said shank portion in vertical alignment with said hook portion and received by said slit to permit relative longitudinal sliding of said members and adapted to be received by said recesses upon a partial rotation of said hook member within said tubular member for engaging the lug with the bottom wall of the recess for preventing relative longitudinal sliding of said members and bringing the hook portion into position whereby it may be engaged over the top of the back of the seat.

2. A back cushion for the seat of an automobile comprising an inflatable cushion for supporting the back of an occupant of the automobile and means for adjustably supporting said cushion above the seat portion of said seat comprising a member fixed to said inflatable cushion and having a longitudinally extending slot therein, a hook member having a hook portion for engaging over the top of the back of the seat, said members adapted to have relative longitudinal movement, a screw threaded element on said hook member and extending through and beyond the slot in said fixed member, and a locking element threadedly received by said screw threaded element and cooperating therewith and with the sides of said slot to releasably lock said members together against relative longitudinal movement.

3. A back cushion for the seat of a vehicle comprising a cushion for supporting the back of an occupant of the vehicle, and means for selectively supporting said cushion at various heights above the seat portion of the seat comprising a pair of tubular members fixed to said cushion at spaced apart points and each having a longitudinally extending slit therein and a series of longitudinally spaced apart transversely extending recesses opening into said slit and having a bottom wall angularly displaced from said slit substantially ninety degrees, and a supporting member telescopically received by each tubular member and having a hook portion adapted to be detachably engaged with the back of the seat, each of said supporting members having a lug extending therefrom in vertical alignment with said hook portion and adapted to travel in the slit of its tubular member to permit telescopic movement of the supporting member in its tubular member and adapted to be received selectively by said recesses upon a partial rotation of said supporting member for engaging the lug with the bottom wall of the recess for preventing telescopic movement of said members and bringing the hook portion into position whereby it may be engaged over the top of the back of the seat.

4. A back cushion for the seat of a vehicle comprising a cushion for supporting the back of an occupant of the vehicle and means for selectively supporting said cushion at various heights above the seat portion of the seat comprising a pair of slotted members fixed to said cushion, a supporting member associated with each of said slotted members and capable of relative longitudinal movement therewith, a screw on each supporting member and adapted to extend through the slot in its slotted member, a nut adapted to be received by each screw for retaining its associated members against relative longitudinal movement when screwed home.

5. A back cushion for the seat of an automobile comprising a multi-celled inflatable cushion for supporting the back of an occupant of the automobile, and means for adjusting the vertical distance of the cushion above the seat portion of the automobile seat comprising a pair of members fixed to the rear wall of the cushion in horizontally spaced apart relation and inwardly of the sides of the cushion and a movable member adjustably attached to each of said fixed members and having a portion adapted to engage the back of the seat, whereby the cushion may be selectively attached to the back of the seat at various distances above the seat portion of the seat with the rear wall of the cushion engaging the back of the seat so that localized pressures imparted to the cushion by the occupant on each side of the fixed members will cause the portions of the rear wall of the cushion adjacent to and on each side of the fixed members to flex into firm contact with the back of the seat to help hold the cushion from shifting on the back of the seat.

References Cited in the file of this patent

UNITED STATES PATENTS

| | | |
|---|---|---|
| 802,526 | Russell | Oct. 24, 1905 |
| 1,673,433 | Wheeler et al. | June 12, 1928 |
| 1,788,675 | Johnson | Jan. 13, 1931 |
| 1,795,304 | Howard | Mar. 10, 1931 |
| 2,060,298 | Gailey | Nov. 10, 1936 |
| 2,072,791 | Baer | Mar. 2, 1937 |
| 2,304,349 | Fox | Dec. 8, 1942 |
| 2,612,645 | Boland | Oct. 7, 1952 |
| 2,634,799 | Young | Apr. 14, 1953 |

OTHER REFERENCES

Airubber Corporation, received Library Feb. 23, 1926.